United States Patent [19]

Hitchcock

[11] 4,444,049
[45] Apr. 24, 1984

[54] ENGINE TESTING APPARATUS AND METHODS

[75] Inventor: Keith N. Hitchcock, Worcester, England

[73] Assignee: Froude Consine Limited, England

[21] Appl. No.: 455,418

[22] Filed: Jan. 3, 1983

Related U.S. Application Data

[63] Continuation-in-part of Ser. No. 333,386, Dec. 22, 1981, abandoned, and a continuation-in-part of Ser. No. 333,382, Dec. 22, 1981, abandoned, and a continuation-in-part of Ser. No. 333,387, Dec. 22, 1981.

[30] Foreign Application Priority Data

Dec. 22, 1980 [GB] United Kingdom ............... 8040969
Dec. 22, 1980 [GB] United Kingdom ............... 8040966
Jan. 22, 1981 [GB] United Kingdom ............... 8102004
Jan. 4, 1982 [GB] United Kingdom ............... 8200089
Sep. 13, 1982 [GB] United Kingdom ............... 8226057

[51] Int. Cl.$^3$ .......................................... G01M 15/00
[52] U.S. Cl. ........................ 73/119 A; 73/117.3; 73/120
[58] Field of Search ............. 73/119 A, 116, 118, 73/119 R, 660, 627, 649, 117.3, 120

[56] References Cited

U.S. PATENT DOCUMENTS

| | | | |
|---|---|---|---|
| 3,416,630 | 12/1968 | Pohl et al. ........................... | 181/0.5 |
| 3,498,123 | 3/1970 | Tsuchiya ............................ | 73/120 |
| 3,580,092 | 5/1971 | Scarpa . | |
| 3,731,527 | 5/1973 | Weaver ............................... | 73/119 A |
| 3,781,782 | 12/1973 | Scott et al. ........................ | 73/649 |
| 3,930,404 | 1/1976 | Ryden . | |
| 4,052,663 | 10/1977 | Lindsey ............................. | 324/16 R |
| 4,102,181 | 7/1978 | Cser et al. ......................... | 73/119 A |
| 4,109,517 | 8/1978 | Dyballa et al. ................... | 73/119 A |
| 4,143,319 | 3/1979 | Rouam ............................... | 324/219 |
| 4,289,032 | 9/1981 | Tominaga et al. ................ | 73/599 |
| 4,384,480 | 5/1983 | Krage et al. ....................... | 73/116 |
| 4,407,155 | 10/1983 | Sundeen ............................. | 73/116 |

FOREIGN PATENT DOCUMENTS

| | | |
|---|---|---|
| 3658A | 8/1979 | European Pat. Off. . |
| 2537219 | 3/1977 | Fed. Rep. of Germany . |
| 2658253 | 7/1977 | Fed. Rep. of Germany . |
| 2517751 | 8/1977 | Fed. Rep. of Germany . |
| 2639133 | 3/1978 | Fed. Rep. of Germany . |
| 46-11786 | 3/1971 | Japan . |
| 811910 | 4/1959 | United Kingdom . |
| 1004840 | 9/1965 | United Kingdom . |
| 1035246 | 7/1966 | United Kingdom . |
| 1089300 | 11/1967 | United Kingdom . |
| 1217866 | 12/1970 | United Kingdom . |
| 1288853 | 9/1972 | United Kingdom . |
| 1372724 | 11/1974 | United Kingdom . |
| 1498742 | 1/1978 | United Kingdom . |
| 1555018 | 11/1979 | United Kingdom . |
| 2035558 | 6/1980 | United Kingdom . |
| 2035560 | 6/1980 | United Kingdom . |
| 2043250A | 10/1980 | United Kingdom . |
| 2093184A | 8/1982 | United Kingdom . |
| 2093186A | 8/1982 | United Kingdom . |
| 2103366 | 2/1983 | United Kingdom . |

OTHER PUBLICATIONS

"Ultrasonic Testing of Materials", Krautkramer, p. 516 and p. 569, last paragraph.

*Primary Examiner*—Jerry W. Myracle
*Attorney, Agent, or Firm*—Leydig, Voit, Osann, Mayer and Holt, Ltd.

[57] ABSTRACT

An engine timing apparatus comprises an ultrasonic transducer 8 which directs a pulsed ultrasonic beam into a cylinder and converts the reflected ultrasonic signals into electrical signals. A sample/hold circuit 67 samples this signal at a time after each pulse when signal reflected by a piston ring passing through the beam are expected. A microcomputer 65 detects changes in the level of the sampled signal caused by the piston rings as the crankshaft rotates, and receives signals from a transducer 71 indicating the crankshaft position to allow top dead center position to be found. The microcomputer receives signals from a microphone 51 directed at a fuel injector indicative of the onset of ignition and calculates the timing angle of the engine. The apparatus also calculates engine speed and detects piston slap.

33 Claims, 24 Drawing Figures

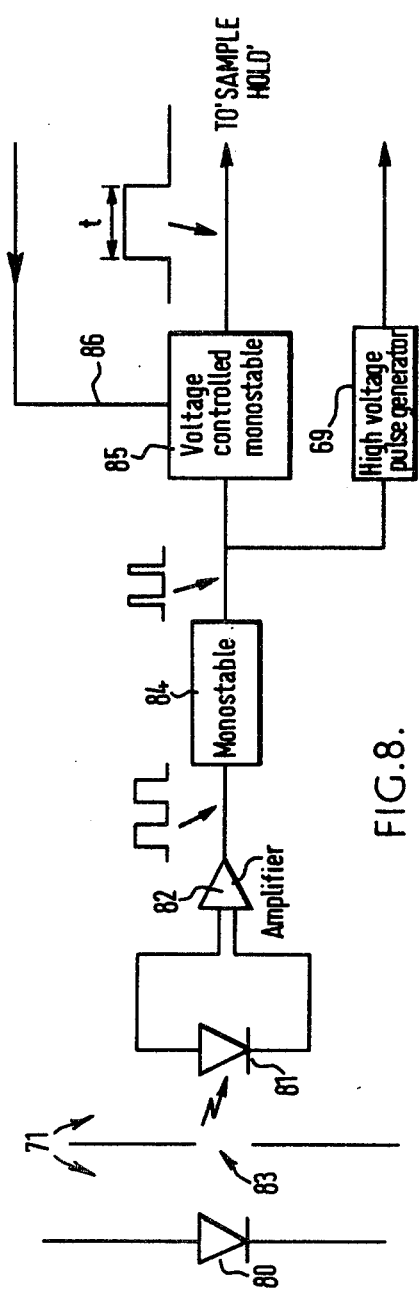
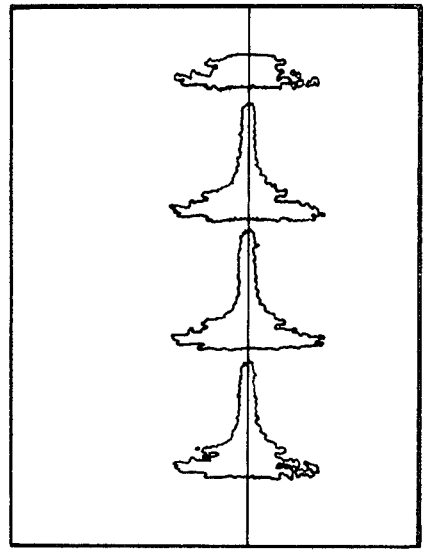
FIG. 10.
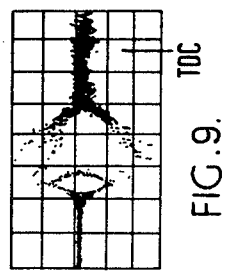
FIG. 9.
FIG. 8.

ENGINE TESTING APPARATUS AND METHODS

CROSS-REFERENCES TO RELATED APPLICATIONS

This application is a continuation-in-part of my U.S. patent application Ser. No. 333,386 now abandoned filed Dec. 22, 1981 entitled "Improvements in or relating to methods of and apparatuses for determining opening of injectors".

This application is also a continuation-in-part of my U.S. patent application Ser. No. 333,382 now abandoned filed Dec. 22, 1981 entitled "Improvements in or relating to method of detecting piston rings in piston engines".

This application is also a continuation-in-part of U.S. patent application Ser. No. 333,387 filed Dec. 22, 1981, entitled "Improvements in or relating to methods of and apparatuses for indicating a predetermined position of a piston or crankshaft of a piston engine".

BACKGROUND OF THE INVENTION

1. Field of the Invention

This invention relates to improvements in or relating to engine testing apparatus and methods, "engine testing" including inter alia detection of "top-dead-centre" (when a piston of a piston engine is in the maximum compression position), detection of fuel-injection, measurement of fuel-injection angle or timing, detection of piston rings and detection of piston slap.

Rapid and easy testing of internal combustion piston engines is becoming more and more desirable both in the engine-manufacturing industry, in which large numbers of engines have to be tested, and in engine repair establishments, in which full automation is not really feasible. In present-day engine-manufacture, testing of each and every engine is preferred to sample engine testing because of the high expense of replacing an installed defective engine. However, this does mean that the available time is limited for testing any given engine. In present-day engine-repair establishments, which cannot be fully automated, it is the high cost of manual labour and overheads which limits the time which can be spared for testing any given engine.

Accordingly the ability to carry out rapid and non-intrusive tests for top-dead-centre, fuel injection timing, piston slap and so forth would be highly beneficial.

SUMMARY OF INVENTION

According to a first aspect of the invention, there is provided a method of indicating a predetermined position of a crankshaft of a piston engine, said engine comprising at least one piston reciprocating in a cylinder and connected to said crankshaft, said method comprising: transmitting and receiving an ultrasonic signal at a place intermediate the ends of the piston stroke in the cylinder; producing first and second electrical signals responsive to first and second changes respectively in the received ultrasonic signal due to passage of a part of the piston past the said place on first and second successive strokes respectively of the piston; means for providing a third electrical signal corresponding to incremental rotary positions of the crankshaft, and processing means for determining the predetermined position from the first, second and third electrical signals.

Such a method and apparatus may be used to indicate top dead centre of a piston for an engine which does not have any marking on its crankshaft, or for checking such a marking when provided. In the case of an internal combustion engine, it is thus possible to check the timing in the absence of any such marks on a flywheel thereof, or when a slave flywheel is provided when the engine is mounted on a test stand. The timing may thus be checked without requiring that the engine be dismantled.

The means for providing the third signal may be an optical transducer comprising a light emitter arranged to direct a beam of light to a photoelectric transducer such that individual teeth of a flywheel of the engine interrupt the beam. Alternatively, the means for providing the third signal may be a transducer of the proximity-sensitive type so as to provide a signal when each tooth of the flywheel is adjacent the transducer.

The ultrasonic technique used for providing the first and second signals may be a pulse echo technique, a through transmission technique, a resonance technique, or a combination thereof. However, the pulse echo technique is preferred. It is also preferred to use a focussed system whereby the ultrasonic beam is brought to a focal point or zone at the bore surface of the cylinder of the engine.

The piston and/or the piston ring or rings may be used as means for reflecting the ultrasonic waves so as to provide the first and second signals. Such a technique is possible where the engine being tested is such that the cylinder block has a solid web of material between the or one of the cylinder bores and the exterior of the engine at which the ultrasonic beam is to be received. Further, the solid web should be at a position such that the ultrasonic beam is directed towards the cylinder at a point intermediate the ends of a stroke of the piston therein. In this respect, an ultrasonic probe may be coupled to the engine block on the exterior surface, for instance by means of oil or some other coupling medium, and be oriented so as to direct the ultrasonic beam in a radial plane with respect to the cylinder and at right angles to a tangent to the cylinder bore.

However, a preferred technique involves directing the ultrasonic beam towards the cylinder in the manner described above, but utilising the damping of the signal received from the bore surface of the cylinder by the piston and/or the piston ring or rings. Thus, when a piston or a ring thereof is not in the ultrasonic beam, an ultrasonic signal is reflected back from the bore surface of the cylinder and is detected by an ultrasonic transducer. However, when the piston or a ring thereof passes through the beam, the ultrasonic signal is damped by the piston or the ring so that the level of the signal reflected to the transducer is substantially reduced. An advantage of this technique is that it is capable of operation when the ultrasonic beam is direceted through a water jacket or the like surrounding the cylinder such that no web of solid material, as required in the above mentioned method, is abailable for the introduction of the ultrasonic beam. Thus, although the presence of a water jacket through which the ultrasonic beam must pass causes some attenuation of the ultrasonic beam, nevertheless the damping technique is capable of providing sufficiently good first and second signals, so that the present invention is applicable to virtually any form of piston and cylinder engine, no matter what the actual configuration of the cylinder block. This technique is also of advantage as it is capable of use with any form of cylinder liner in such an engine. Thus, the invention may be used equally well with engines whose cylinders are provided with wet liners or with dry liners.

The frequency of the ultrasonic sound beam is preferably above 1 MHz. However, the frequency may be varied as necessary and the actual frequency used depends, to some extend, on the particular engine to be tested.

According to a third aspect of the invention, there is provided a method of detecting a piston ring of a piston in a cylinder of a piston engine, comprising the steps of, directing an ultrasonic beam through the cylinder block of the engine towards the cylinder, moving the piston in the cylinder, and receiving and examining an ultrasonic signal from the cylinder for a characteristic of the piston ring.

According to a fourth aspect of the invention, there is provided an apparatus for detecting a piston ring of a piston in a cylinder of a piston engine, comprising ultrasonic transducer means for transmitting an ultrasonic beam through the cylinder block of the engine towards the cylinder, and for receiving an ultrasonic signal therefrom, means for moving the piston in the cylinder, and means for examining the received ultrasonic signal for a characteristic of the piston ring.

The ultrasonic beam may be produced by an ultrasonic transducer disposed in contact with one side of the cylinder block and a further ultrasonic transducer may be disposed in contact with the other side of the cylinder block to receive ultrasound transmitted through the cylinder. Alternatively, a single ultrasonic transducer may be disposed on one side of the cylinder block for transmitting the ultrasonic beam towards the cylinder and for receiving reflected ultrasound. The piston is normally a clearance fit in the cylinder bore and is normally provided with annular piston rings which are seated in annular grooves of the piston and which are in intimate contact with cylinder bore to seal the chamber above the piston.

When the piston is moved in the cylinder through the ultrasonic beam, it appears that the clearance between the piston and the cylinder bore attenuates the ultrasound so that a signal of relatively small amplitude is transmitted or reflected. However, when a piston ring passes through the ultrasonic beam, it appears that attenuation is relatively small because of the intimate contact between the ring and the cylinder bore, so that a signal of relatively large amplitude is transmitted or reflected. This signal which is characteristic of the piston ring can be readily detected to as to indicate the presence of the ring.

For instance, in the case of an internal combustion engine, each piston is normally provided with three piston rings. Thus, it is possible to detect the presence of the rings without having to dismantle the engine or check gases entering the crank case which might indicate leakage of combustion gases because of the absence of a ring. The three piston rings normally comprise two compression rings, disposed nearer the piston crown and of rectangular cross-section, followed by an oil control or scraper ring comprising an annular ring with a annular recess in its outer surface. The ultrasonic signal transmitted or reflected by the oil scraper ring as it passes through the ultrasonic beam thus has a form with two adjacent amplitude peaks and differs from the signal of the compression rings. It is thus possible to detect the presence of the oil scraper ring and to determine whether it is in its correct position in relation to the other rings on the piston.

Examination of the reflected or transmitted ultrasonic signals may be by electronic means such as an oscilloscope. For instance, the returned signals or the envelope thereof may be displayed on the oscilloscope screen so that peaks corresponding to the piston rings can be observed. The engine may be turned over or may be running normally during a test, and may be on a test stand or mounted in a vehicle. The oscilloscope may be a storage-type and may be triggered so as to store and display signals from a single upward movement of the piston through the ultrasonic beam.

The or each ultrasonic transducer may be arranged for attachment to the cylinder block in a readily detachable manner, so that the piston rings on all the pistons of a multi-cylinder engine can be checked quickly and easily.

According to a fifth aspect of the invention, there is provided a method of determining the occurrence of piston slap in a cylinder of a piston engine, said engine comprising a piston reciprocating in said cylinder and connected to a rotating crankshaft, the piston including a known number of piston rings in known positions on the piston said method comprising, transmitting a pulsed ultrasonic beam into said cylinder at a given region of the wall of said cylinder, receiving reflected ultrasonic signal pulses from said region of the cylinder wall, the amplitude of a portion of each received ultrasonic signal pulse having a normal value when no part of the piston is in intimate contact with said region of the cylinder wall and having a different value when a part of the piston is in intimate contact with said region of the cylinder wall, transducing each received ultrasonic signal pulse into a corresponding electrical signal pulse, of which a portion, corresponding to said portion of the ultrasonic signal pulse, has different values correspondingly, sampling each electrical signal pulse at a timed instart such as to sample said portion thereof, producing from the sampling a pattern of parts of the piston in intimate contact with said region of the cylinder wall, and from the pattern distinguishing the parts of the piston which are piston rings in intimate contact with said region of the cylinder wall from a part of the piston which due to piston slap is in intimate contact with said region of the cylinder wall.

According to a sixth aspect of the invention, there is provided an apparatus for use in determining the occurrence of piston slap in a piston engine, said engine comprising a piston reciprocating in said cylinder and connected to a rotating crankshaft, the piston including a known number of piston rings in known positions on the piston, said apparatus comprising, means for transmitting a pulsed ultrasonic beam into said cylinder at a given region of the wall of said cylinder and for receiving reflected ultrasonic signal pulses from said region of the cylinder wall such that the amplitude of a portion of each received ultrasonic signal pulse has a normal value when no part of the piston is in intimate contact with said region of the cylinder wall and has a different value when a part of the piston is in intimate contact with said region of the cylinder wall, means for transducing each received ultrasonic pulse into a corresponding electrical signal pulse, of which a portion, corresponding to said portion of the ultrasonic signal pulse, has different values correspondingly, means for sampling each electrical signal pulse and for timing such sampling so that said varying portion of the electrical signal pulse is sampled and means for producing from the sampling a pattern of parts of the piston in intimate contact with said region of the cylinder wall, whereby from the pattern it is possible to distinguish the parts which are piston rings of the piston in intimate contact with said region of the cylinder wall from a part which due to piston slap is in intimate contact with said region of the cylinder wall.

According to a seventh aspect of the invention, there is provided a method of determining opening of an injector, comprising the steps of, applying an electro-acoustic transducer to an injector, and monitoring the level of the output signal of the transducer to detect an increase therein indicative of opening of the injector.

According to an eighth aspect of the invention there is provided an apparatus for determining opening of an injector, comprising an electro-acoustic transducer arranged to be applied to the injector and arranged to produce an output signal, and a monitoring circuit arranged to monitor the level of the output signal of the transducer to detect an increase therein indicative of opening of the injector.

According to a ninth aspect of the invention, there is provided a method of measuring the speed of a piston engine, comprising directing an ultrasonic beam into a cylinder of the engine at a position intermediate the ends of a piston stroke, providing signals corresponding to the passage of the piston through the ultrasonic beam, and counting the signals during a predetermined time period to provide a measure of the engine speed.

According to a tenth aspect of the invention, there is provided an apparatus for measuring the speed of a piston engine, comprising means for transmitting an ultrasonic beam into a cylinder of the engine at a position intermediate the ends of a piston stroke, means for receiving ultrasonic signal from the cylinder corresponding to passage of the piston through the ultrasonic beam, and means for counting the signals during a predetermined time period to provide a measure of the engine speed.

BRIEF DESCRIPTION OF DRAWINGS

FIG. 8 is a block diagram showing in more detail part of the circuit shown in FIG. 7;

FIG. 9 illustrates a typical oscilloscope trace of the output of the microphone of FIG. 5;

FIG. 10 shows four consecutive output signals from the ultrasonic transducer of FIG. 3;

DESCRIPTION OF PREFERRED EMBODIMENT

General

Figure 1:
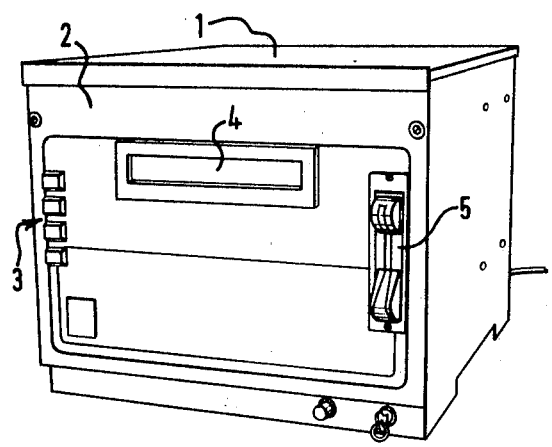
FIG. 1 shows an apparatus constituting a preferred embodiment of the invention.

The preferred embodiment of the invention is an apparatus 1 (FIG. 1) for use in testing an engine 6 (FIG. 2) for detecting inter alia top-dead-centre (see above), fuel-injection, fuel-injection angle or timing, piston rings and piston slap, is discussed above under the heading "Field of the invention".

As discussed in more detail hereinafter, the apparatus 1 is used in conjunction with a shaft encoder 72 (FIGS. 21 and 22) for determining the instantaneous position of the engine crankshaft relative to an arbitrary datum, an ultrasonic transducer 8 for detecting motion of a piston of the engine and a microphone 51 (or 11-FIG. 6) for detecting fuel-injection.

The apparatus 1 has a front panel 2 on which are provided operator controls 3 in the form of four push button switches, a digital display 4, and a card reader 5.

The Engine To Be Tested

Figure 2:
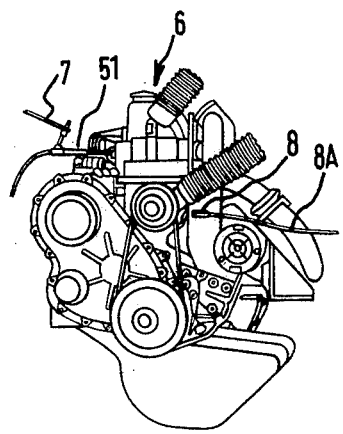
FIG. 2 illustrates the location of an ultrasonic microphone and an ultrasonic transducer with respect to an engine to be tested.
Figure 3:
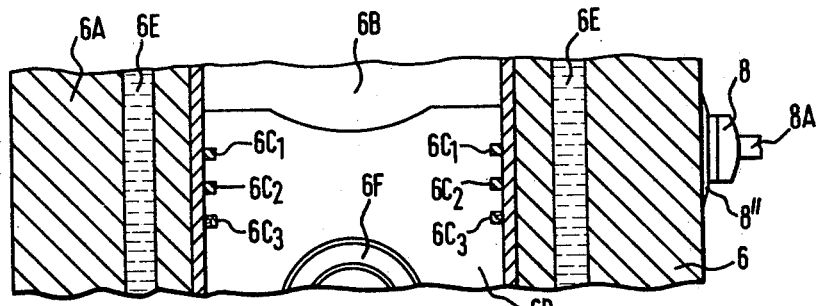
FIG. 3 shows a cross-section through a cylinder of the engine shown in FIG. 2 illustrating more clearly the location of the transducer.

FIGS. 2 and 3 show an engine 6 which is to be tested by means of the apparatus 1.

The engine 6 comprises a cylinder block 6A having formed therein one or more cylinders 6B. The cylinders 6B may be lined by cylinder liners (not shown) in the conventional way. Each cylinder 6B contains a piston 6D connected to a crankshaft (not shown) by a piston rod (not shown). The piston 6D has adjacent its crown three annular recesses in which are seated piston rings $6C_1$, $6C_2$ and $6C_3$. The piston rings $6C_1$ and $6C_2$ nearer the crown of the piston are compression rings whose purpose is essentially to provide a seal between the piston skirt and the cylinder bore so as to seal off the combustion chamber above the piston. The lowermost ring $6C_3$ in the drawings in an oil scraper ring whose purpose is to scrape oil from the cylinder bore for return to the crank-case or oil sump of the engine. Each of the piston rings $6C_1$ and $6C_2$ has a rectangular cross-section, whereas the cross-section of the oil scraper ring $6C_3$ has the form of a rectangular from which a rectangular portion has been removed on its outermost side. Thus, the oil scraper ring $6C_3$ has formed therein an external annular recess. The oil scraper ring $6C_3$ thus contacts the cylinder bore at two annular surfaces spaced apart longitudinally of the piston by a short distance.

ULTRASONIC TRANSDUCER FOR PISTON MOTION DETECTION

The ultrasonic transducer 8 is located against the exterior of the cylinder block 6A (FIG. 3) of the engine 6 in a position such as to direct an ultrasonic beam (which may or may not be modulated or pulsed) into, for example, No. 1 cylinder 6B so that the ultrasonic beam is radial with respect to the cylinder 6B and such that the (three) piston rings 6C on a piston 6D within the cylinder 6B pass through the ultrasonic beam during each stroke of the piston. FIG. 3 shows a water jacket 6E surrounding the cylinder 6B and also shows a gudgeon pin 6F of the piston 6D.

It is believed that the ultrasonic beam is propagated through the solid cylinder block 6A and through a cylinder liner (where provided) in intimate contact therewith with relatively little attenuation. It appears that when the ultrasonic beam reaches the cylinder bore in the absence of the piston 6D being in line with the beam, the ultrasonic radiation is transmitted into the cylinder and a relatively small portion is reflected back towards the transducer 8. The reflected radiation is received by the transducer 8 and is converted into corresponding electrical signals supplied via a lead 8A to the apparatus for processing of the signals.

For the purposes of the method, the engine may remain installed in a vehicle and may be started and allowed to run normally. Alternatively, the engine may be mounted in a test stand and may be connected up to the appropriate services to allow it to run normally. If desired, the crankshaft of the engine may be rotated by some other means without allowing the engine to run. According to another possibility, in the case of a compression-ignition or diesel engine, a source of compressed air may be connected to the fuel inlet of the engine so as to cause the crankshaft to rotate.

An oscilloscope may be used to display the ultrasonic signal or its envelope. The oscilloscope may be of the storage type and may be arranged to store and display the signal or the envelope thereof for a single upward passage of the piston through the ultrasonic beam. Alternatively, in the case of an oscilloscope of the non-storage type, the oscilloscope may be triggered at a predetermined position of each upward stroke of the piston.

Because the oil scraper ring $6C_3$ has two annular surfaces in intimate contact with the cylinder bore, the increase in amplitude of the returned ultrasonic signal should have two peaks corresponding to passage of the oil scraper ring $6C_3$ through the beam. This ring should therefore be able to be clearly identified by the apparatus connected to the lead 8A. The method may therefore be used to check that the correct number of rings has been provided on each piston, and to check that the oil scraper ring is in its correct position on the piston. The transducer 8 may be held manually against the cylinder block 6A adjacent the position of each cylinder of a multi-cylinder internal combustion engine, or may be provided with means for holding it in each such position, so that the piston of each piston of the engine can be checked quickly and easily. Thus, it is unnecessary to dismantle the engine in order to check the piston rings. Further, the rings may be checked directly by this method without requiring searching for secondary effects of an incorrect piston ring arrangement, such as the presence in the crank-case of combustion gases suggesting that one or more of the rings is missing. This method therefore provides a quick, inexpensive, and reliable method of checking piston rings of piston engines.

The transducer 8 is preferably of a type which responds to reflected ultrasonic waves as shown in solid lines in FIG. 3 and thus incorporates an ultrasonic transmitter and ultrasonic receiver, both directed towards the adjacent cylinder 6B of the engine 6. Alternatively, the transducer may comprise an ultrasonic transmitter (as at 8 in FIG. 3) and an ultrasonic receiver (as in dotted lines at 8' in FIG. 3) disposed on opposite sides of the cylinder so as for the ultrasonic recceiver to be responsive to the beam of ratiation received from the transmitter.

The ultrasonic technique used for providing the signals may be a pulse echo technique, a through transmission technique, a resonance technique, or a combination thereof. However, the pulse echo technique is preferred.

The piston 6D and/or the piston rings 6C may be used as means for reflecting the ultrasonic waves so as to provide signals to be counted. Such a technique is especially possible where the engine being tested is, as in FIG. 4, such that the cylinder block 6'A has a solid web 6'G of material between the or one of the cylinder 6'B bores and the exterior of the engine at which the ultrasonic beam is to be received. Further, the solid web 6'G must be at a position such that the ultrasonic beam is directed towards the clinder 6'B at a point intermediate the ends of a stroke of the piston 6'D therein. In this respect the ultrasonic probe 8 is normally coupled to the engine block on the exterior surface, for instance by means of oil or grease 8" or some other coupling medium, and is oriented so as to direct the ultrasonic beam in a radial plane with respect to the cylinder (6B in FIG. 3, 6'B in FIG. 4) and at right angles to a tangent to the cylinder bore.

However, a preferred technique involves directing the ultrasonic beam towards the cylinder in the manner described above, but utilising the modification of the signal received from the bore surface of the cylinder by the piston 6D, 6'D and/or the piston rings 6C, 6'C. Thus, when the piston or a ring thereof is not in the ultrasonic beam, an ultrasonic signal is reflected back from the bore surface of the cylinder and is detected by the ultrasonic transducer. However, when the piston 6D, 6'D, or a ring 6C, 6'C thereof passes through the beam, the ultrasonic signal is modified by the piston or the ring so that the level of the signal reflected to the transducer is substantially changed. An advantage of this technique is that it is capable of operation when the ultrasonic beam is directed through a water jacket (as for water jacket 6E in FIG. 3) or the like surrounding the cylinder such that no web of solid material, as required in the above mentioned method, is available for the propagation of the ultrasonic beam. Thus, although the presence of a water jacket through which the ultrasonic beam must pass causes some attenuation of the ultrasonic beam, nevertheless the technique is capable of providing sufficiently good signals, so that the technique is applicable to virtually any form of piston and cylinder engine, no matter what the actual configuration of the cylinder block. This technique is also of advantage as it is capable of use with any form of cylinder liner in such an engine. Thus, the technique may be used equally well with engines whose cylinders are provided with wet liners or with dry liners. The frequency of the ultrasonic sound beam is generally above 1 MHz. However, the frequency may be varied as necessary and the actual frequency used may depend to some extent, on the particular engine to be tested.

In any event, the transducer 8 is mounted so as to direct a narrow beam of ultrasonic sound through the wall of the cylinder block and across the cylinder at a height such that the piston interrupts the beam, for instance, at and adjacent its top dead centre position. At other positions of the piston, for instance at bottom dead centre, the piston remains out of the ultrasonic beam produced by the transducer 8.

The transducer 8 is mounted without an air gap on the side wall of the cylinder block of the engine so as to prevent undersirable attenuation of the ultrasonic waves. The ultrasonic waves pass through the piston, for instance through one of the piston rings in intimate contact with the internal surface of the cylinder, when the piston is at or near its top dead centre position. The ultrasonic waves reflected back to the transducer 8 are thus modified. When the piston is in a position such that it is not in the ultrasonic beam, the ultrasonic waves reflected back to transducer 8 are different, to produce an electrical signal. Alternatively, in the case of the presence of a two part transducer shown at 8 and 8' in FIG. 4, when the piston 6'D is at or near its top dead centre position it modifies the ultrasonic beam from the transmitter 8 arriving at the receiver 8'. When the piston 6'D is out of the ultrasonic beam, the level of the output signal of the receiver 8' is different. In either case, the difference in level of the output signal from the transducer gives rise to signals corresponding to passage of the piston rings 6C or 6'C through the ultrasonic beam.

Figure 4:
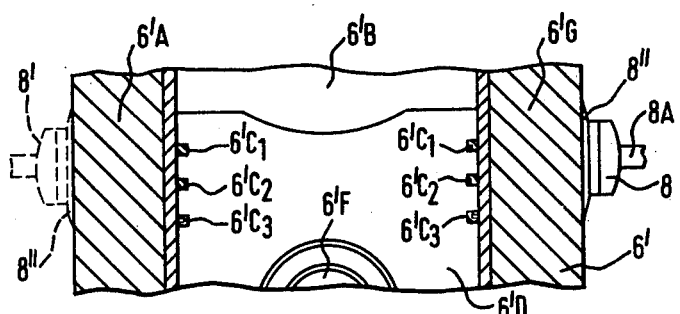
FIG. 4 corresponds to FIG. 3 but for an engine without a water jacket.

In FIG. 4, cylinder block 6'A, cylinder 6'B, piston rings 6'C$_1$, 6'C$_3$, piston 6'D and gudgeon pin 6'F correspond (other than in the respects mentioned above) to cylinder block 6A, cylinder 6B, piston rings 6C$_1$, 6C$_2$ and 6C$_3$, piston 6D and gudgeon pin 6F of FIG. 3.

FUEL-INJECTION DETECTING MICROPHONE

The ultrasonic frequency microphone 51 (shown in more detail in FIG. 5 and discussed more fully hereinafter) is located adjacent a fuel injector and is held in place by means of a clamp 7.

Figure 5:
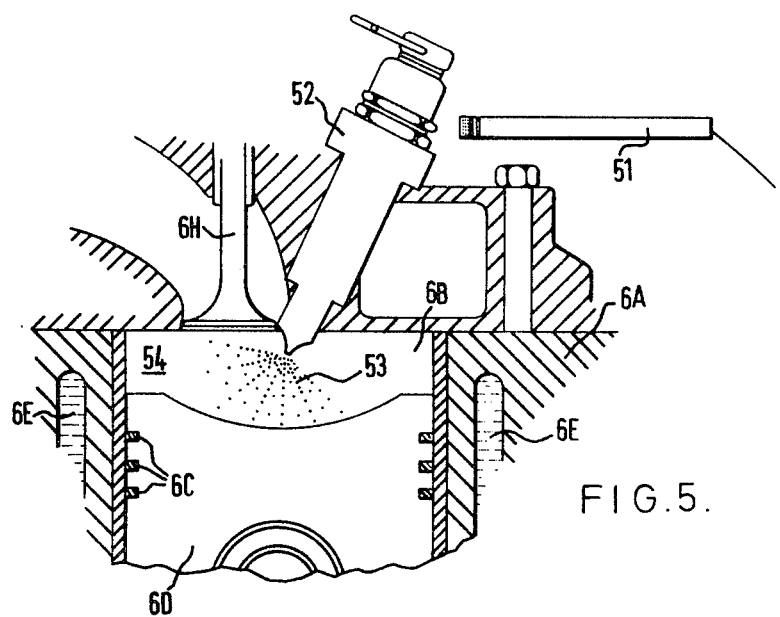
FIG. 5 shows a cross-section through a cylinder of the engine shown in FIG. 2 illustrating more clearly the location of the microphone.

As shown in FIG. 5, the microphone 51 comprises a non-contact directional microphone aimed at a fuel-delivery nozzle 52 of the fuel injector (not otherwise shown) to pick up 40 KHz frequency sound waves produced by the injection of the fuel 53 into the combustion chamber 54 of cylinder 6B of the engine. FIG. 5 also shows an air inlet valve 6H of engine 6.

Figure 6:
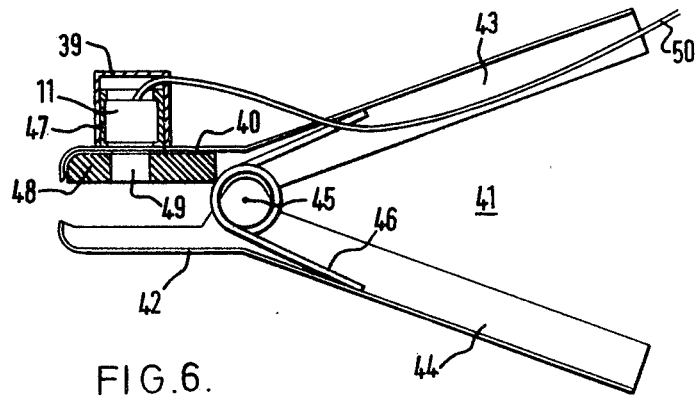
FIG. 6 illustrates another possible form of ultrasonic microphone.

FIG. 6 shows an alternative arrangement in which the microphone 51 is replaced by a directional microphone 11 housed in a transducer housing 39 attached to one jaw 40 of a transducer clamp assembly 41. The jaw 40 and a second jaw 42 are respectively integral with two handles 43 and 44 which are pivoted at 45 and are biased apart (so that the jaws 40 and 42 are biased together) by a spring 56. A foam rubber mounting 47 is used to seat the transducer 11 in the transducer housing 39. Inside the jaw 40 is a foam rubber seal 48 with an aperture 49 for high frequency sound waves from a region between the two jaws 40, 42 to reach the transducer 11. FIG. 6 also shows part of a lead 50 for connecting the transducer 11 to apparatus 1.

By means of the assembly 41, the jaws 40, 42 can be clamped about a fuel-delivery pipe (not shown) of the fuel injector with the foam rubber seal 48 pressed against the fuel-delivery pipe by the force of the spring 46, so that the transducer 11 picks up the 40 KHz frequency sound waves produced by the injection of the fuel. Alternatively, the jaws 40, 42 may be clamped to the body of the fuel-injector (not shown).

Electronic Circuitry

Figure 7:
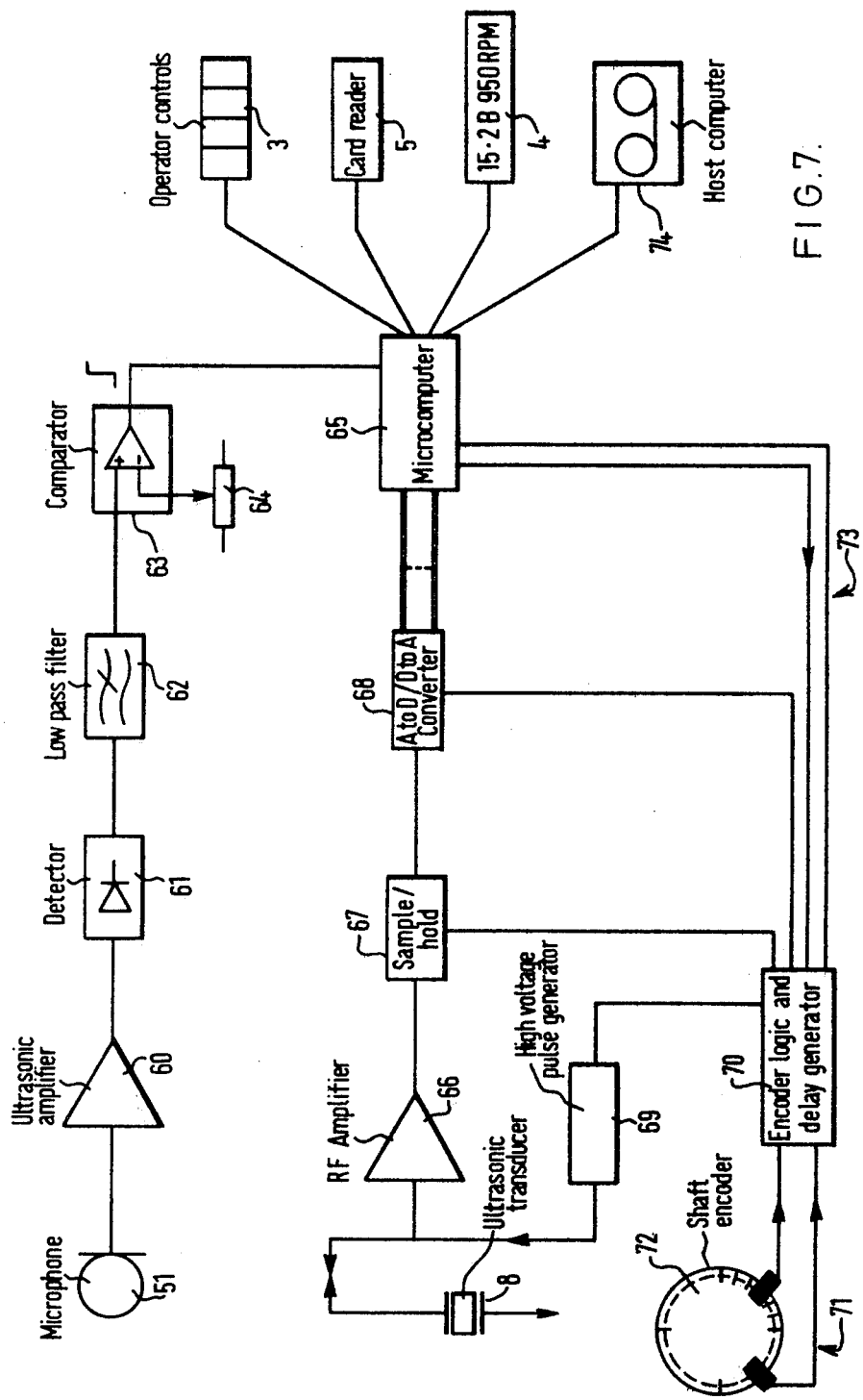
FIG. 7 is a block diagram of the apparatus of FIG. 1.

As shown in FIG. 7, the microphone 51 is connected via an ultrasonic amplifier 60 to the input of an envelope detector 61, whose output is supplied via a low pass filter 62 to a first output of a comparator 63. A second input of the comparator 63 is connected to a potentiometer 64 for setting a reference voltage. The output signal of the microphone 51 is illustrated by an oscilloscope trace in FIG. 9 in which the timing of top dead centre of No. 1 piston has been indicated. The output of the comparator 63 is connected to an input of a microcomputer 65.

The ultrasonic transducer 8 is connected to the input of a RF amplifier 66 whose output is connected to the signal input of a sample/hold circuit 67. The output of the sample/hold circuit is connected to an analogue input of an analogue-to-digital/digital-to-analogue converter 68, whose digital input/output lines are connected to a bi-directional data bus of the microcomputer 65.

The ultrasonic transducer 8 is further connected to the output of a high voltage pulse generator 69 whose trigger input is connected to the output of an encoder logic and delay generator 70. The encoder logic and delay generator has an output connected to a control input of the sample/hold circuit 67 and inputs connected to an optical tranducer 71 of a shaft encoder 72 (see below). The logic and delay generator 70 has an input connected to an analogue output of the converter 68, and may also be under control of the microcomputer 65 by means of control lines 73.

The microcomputer 65 is connected to the operator controls 3, the digital display 4, and the card reader 5. In addition, the microcomputer 65 may be connected to a host computer 74 for use in centralised controlling and analysis of engine timing testing.

FIG. 8 shows the encoder logic and delay generator 70 in some detail.

The output of the amplifier 82 is connected to the input of a monostable 84 arranged to produce constant width output pulses, which are supplied to the trigger input of the high voltage generator 69 and to the trigger input of a voltage controlled monostable 85. The output of the monstable 85 is connected to the control input of the sample/hold circuit 67. The voltage control input 86 of the monostable 85 is connected to the analogue output of the converter 68.

Fuel-Injection, Piston Detection and Crankshaft Rotation Signals

In use, the microphone 51 supplies a wave-form of the type shown in FIG. 9 via the amplifier 60 to the detector 61. If necessary, the amplifier 60 may include filtering so as to pass substantially only frequencies in the region of 40 kHz, signals of this frequency received by the microphone corresponding to the sound of fuel being squirted into the cylinder of the engine being tested. The envelope signals produced by the detector 61 is smoothed by the filter 62 and supplied to the comparator 63, which produces an output signal for the microcomputer 65 whenever the level of the signal received by the microphone 51 rises to indicate the beginning of fuel injection.

The shaft encoder 72 is connected as described hereinafter to the crank shaft of the engine under test, which is forced to rotate or is rotated by the engine as will be described hereinafter, so that the slits in the encoder disc 83 pass one after the other between the light emitting diode 80 and the light sensitive diode 81. Each time a triggering edge of a slit comes into alignment with the diodes, a pulse is produced by the diode 81 which is amplified by the amplifier 82 and triggers the monostable 84. The output pulse from the monostable 84 triggers the high voltage pulse generator 69 which supplies a high voltage pulse to the ultrasonic transducer 8, which resonates at its resonant frequency, for instance about two and half MHz, and produces an ultrasonic beam which is directed into the cylinder of the engine under test. The reflected ultrasonic signals are received by the transducer 8 and amplified by the amplifier 66 before being supplied to the sample/hold circuit 67.

The pulses from the monostable 84 are also used to trigger the voltage controlled monstable 85, which causes a delay t to be produced whose length is varied by the microcomputer 65 via the converter 68 and the control voltage input 86 of the monostable 85. The output signal of the monostable 85 controls holding of the input signals by the sample/hold circuit 67, the output of which is supplied to the microcomputer 65 via the converter 68.

Figure 11:
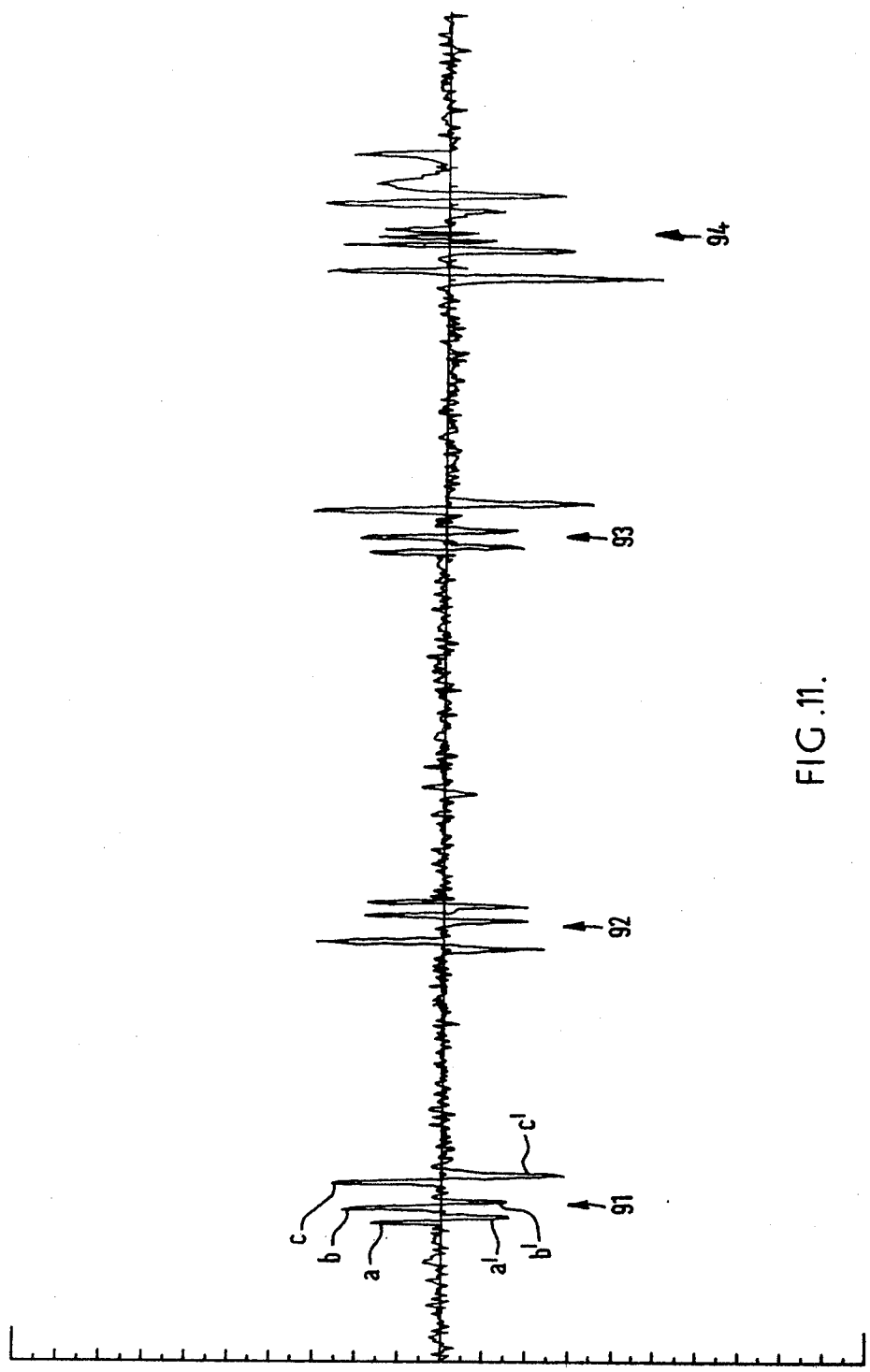
FIG. 11 is a graph of the change in amplitude of one particular peak in the output signal of the transducer for a complete engine cycle (averaged over several such cycles)

In order to detect passage of the piston rings 6C(6'C) through the ultrasonic beam produced by the transducer 8, the microcomputer 65 analyses the signals as will be described in more detail hereinafter. In essence, however, the microcomputer 65 controls the delay t so that the sample/hold circuit 67 samples and holds the amplitude of a particular pulse of the ultrasonic signal reflected to the transducer 8, corresponding to reflection by a piston ring 6C(6'C) passing through the ultrasonic beam. In fact, several pulses or cycles of the reflected two and a half MHz signal are affected by the passes of the piston ring 6C(6'C) through the beam, and the microcomputer 65 is arranged to monitor the pulse whose amplitude changes by the largest percentage or amount so as to maximise the signal-to-noise ration of the apparatus. Thus, the micromputer 65 varies the delay t until the sample/hold circuit 67, which has a "capture" time of approximately 6 nano seconds, stores the peak value of the particular pulse, FIG. 11 illustrates the way in which the amplitude of this pulse changes over one complete engine cycle of the piston in the cylinder being observed i.e. four piston strokes, with the amplitude being plotted at 1 degree intervals. In the absence of a piston ring in the ultrasonic beam, the amplitude of the particular peak varies randomly under the influence of noise and the variation in amplitude is of relatively low level. However, when a piston ring 6C(6'C) passes through the beam, the amplitude of the peak varies above and below the average amplitude level and is readily recognisable. FIG. 11 illustrates the signal for an engine in which the piston has three piston rings, the three separate variations in the amplitude of the peak being clearly visible in each of the fires three piston ring-indicating signals 91, 92 and 93.

More particularly, signal 91, containing three pairs of peaks a, b, c, (a', b', c',) appears to correspond to the passage of the three piston rings past the transducer 8 on the exhaust (usually upward) stroke of the piston, signal 92, which is similar to signal 91, to the following induction (downward) stroke, and signal 93 (which is similar to each of signals 91 and 92) to the following compression stroke. The microcomputer 65 may be programmed to recognise whether the correct number of rings is present on the piston so as to indicate whether a piston ring has been omitted during the assembly of the engine, or even whether a piston ring has broken, which condition is also detectable by the absence of one of the signals a(a'),b(b'),c(c') corresponding to reflection from a ring.

The signal indicated at 94 in FIG. 11 is indicative of piston slap during the power stroke of the piston. This condition corresponds to contact between the skirt of the piston and the cylinder wall which contact causes reflection of the ultrasonic beam similar to that produced by the piston rings when passing through the ultrasonic beam. The microcomputer 65 is programmed to ignore the effects of piston slap when checking engine timing, and is preferably also programmed so as to indicate the presence of piston slap to provide further diagnostic information concerning the state of the engine under test.

The waveform illustrated in FIG. 11 may be displayed upon a video screen of the microcomputer.

Engine Speed Determination

There now follows a description of how the microcomputer 65 determines the engine speed from the output of the transducer 8 (see FIGS. 2,3 and 4).

More particularly, the microcomputer 65 comprises a pulse counter or frequency counter which may be of essentially conventional type. Preferably, the microcomputer 65 includes at its input means responsive to the output signals of the transducer 8 to provide a single pulse for counting each time the piston 6D, 6'D or a ring 6C, 6'C thereof passes through the ultrasonic beam. The pulse counter of the microcomputer 65 counts the number of such pulses during individual time periods in order to provide a measure of the speed of the engine. In the case where the transducer 8 provides a single signal for each passage of the piston 6D, 6'D through the ultrasonic beam, the pulse counter may be preceded by a divide-by-two circuit so that the pulse counter of the microcomputer 65 receives a signal pulse for each revolution of a crankshaft of the engine. In the case where several signals are received by the transducer 8, for instance corresponding to the passage of each piston ring 6C, 6'C on the piston 6D, 6'D through the ultrasonic beam, for each stroke of the piston 6D, 6'D, the pulse counter may be preceded by a frequency divider arranged to supply to the pulse counter a single sulse for every consecutive pair of strokes of the piston. Thus, the pulse counter can provide, at the end of each time period, a count which is respesentative of the number of revolutions of the crankshaft of the engine during the time period. The time period may be selected according to the desired accuracy, resolution, and frequency of measurement.

Alternatively the microcomputer 65 may determine the frequency of injections of fuel detected by the microphone (51 or 11) and derive the engine speed therefrom (multiplying by a factor of two if, as will be usual, the engine in a four-stroke engine in which fuel is injected once per two revolutions per cylinder). If the engine is a spark-ignition engine, the speed may be similarly determined by detecting the spark pulses and measuring their frequency.

Flow (Logic) Diagrams

Before operation of the apparatus under the control of the microcomputer 65 is described with reference to FIGS. 17 to 20, an explanation will be given with reference to FIGS. 12 to 16 to illustrate interpretation of the flow diagram.

Figure 12:
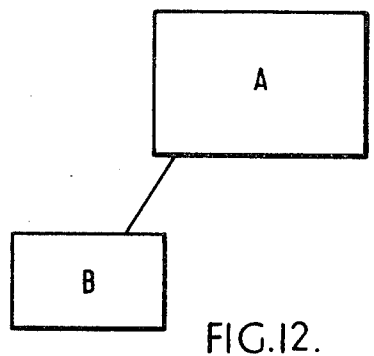
FIGS. 12 to 16 are diagrams for explaining the interpretation of the following flow diagrams.

The diagram shown in FIG. 12 indicates that, during execution of the step A, the step B must be executed.

Figure 13:
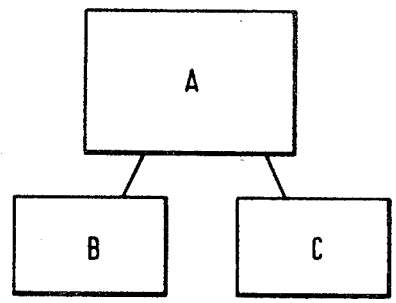

The diagram shown in FIG. 13 indicates that, during the execution of the step A, first the step B and then step C must be executed.

Figure 14:
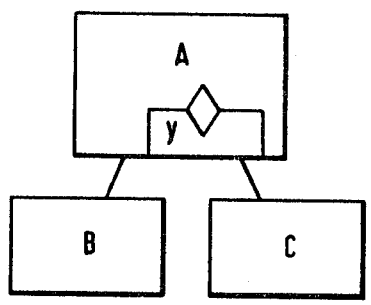

The diagram shown in FIG. 14 indicates that, during the course of executing the step A, the step B, is executed and a test, indicated by the rhombus, is then performed. If the result of this test is y, then the step C is also executed.

Figure 15:
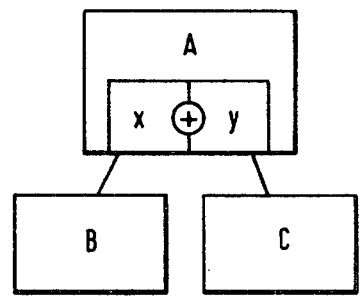

The diagram shown in FIG. 15 indicates that, during the course of executing a step A, a test is made resulting in either x or y. If the result is x, then only the step B is executed. If the result of the test is y, then only the step C is executed.

Figure 16:
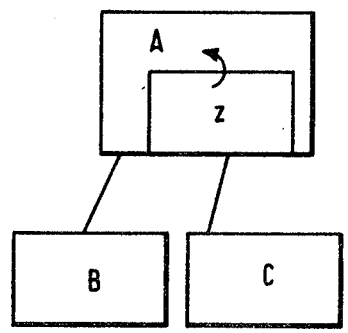

The diagram in FIG. 16 indicates that, during execution of the step A, the step B is executed. The step C is then executed a number of times dependent on condition z.

Software and Operation

Figure 17:
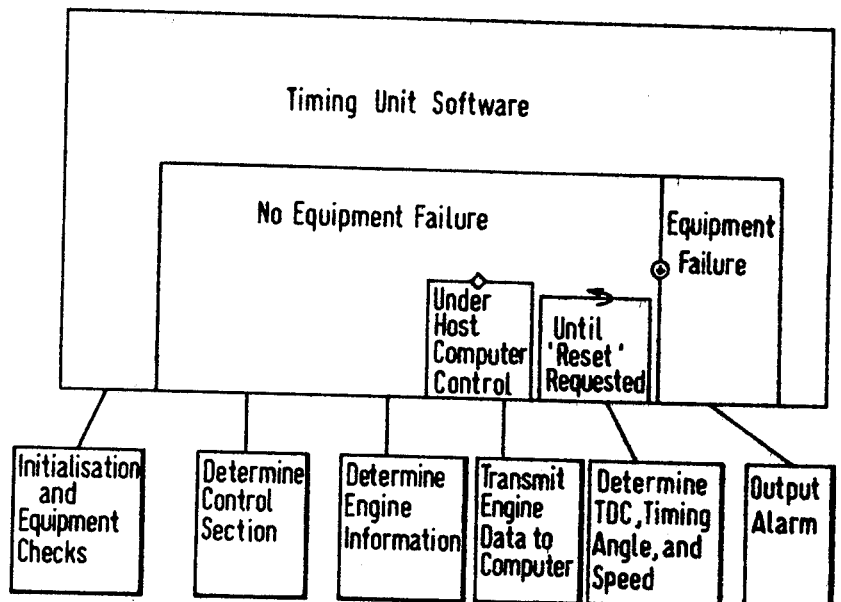
FIGS. 17 to 20 are flow diagrams illustrating the operation of the apparatus of FIG. 1, FIG. 20 being in three parts 20A, 20B and 20C, to be arranged in that order respectively from left to right.

FIG. 17 illustrates the timing unit software of the microcomputer 65. Upon initially switching on the apparatus, various initialization routines and equipment checks are performed so as to prepare the apparatus for use and ensure that the apparatus is functioning correctly. If any equipment failure is detected, then the microprocessor outputs an alarm message, which causes an alarm indication to be provided on the display 4 and/or causes an audible alarm to be produced. If there is no equipment failure, then the microcomputer determines which control station is to be in control of engine timing measurements. For instance, the microcomputer 65 may itself control such measurement. Alternatively, the host computer 74 may control measurement. Determination of engine information then takes place and will be described hereinafter with reference to FIG. 18. If measurement is to be under the control of the host computer, then the microcomputer 65 transmits the engine data to the host computer.

The microcomputer then determines the top dead centre position of the piston, and then the timing angle and the speed of the engine repetitively, until a "reset" request is produced by actuation of a "reset button" of the operator controls 3.

Figure 18:
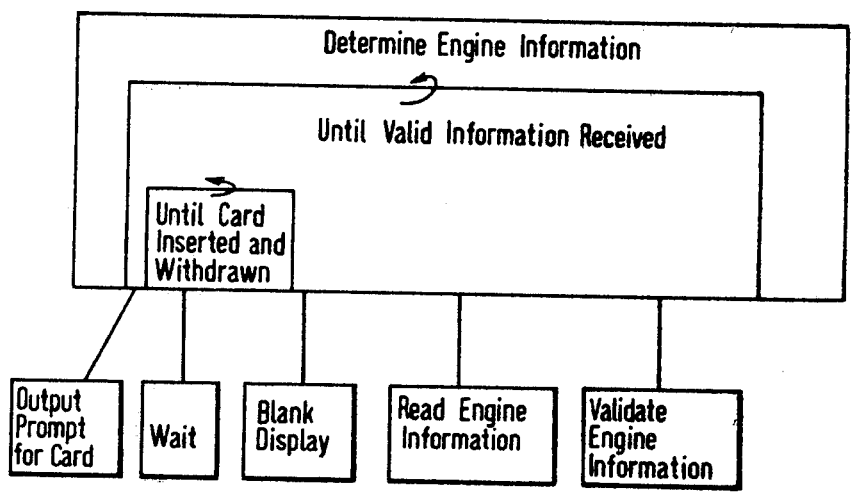

FIG. 18 shows the steps performed to determine engine information. The steps shown in FIG. 18 are repeated until valid information is received.

Initially, an output prompt for a card is provided by means of the display 4 requesting a user to insert a card on which is punched encoded information concerning the engine to be tested. The card contains information relating to the block thickness, water jacket thickness, and engine geometry of the engine to be tested. In the case of engine geometry, if the crank shaft is off-set, then top dead centre will not be mid-way between the piston up and piston down positions, and the information in the card allows for correction to compensate for this. The card may also carry general information, for instance for working with the host computer to ensure that the right card is inserted for the right engine.

Once a card has been inserted into and withdrawn from the card reader 5, the prompt on the digital display is blanked and the engine information is read into the microcomputer. The microcomputer then validates the engine information, for instance so as to ensure that no "impossible" data has been erroneously entered.

Figure 19:
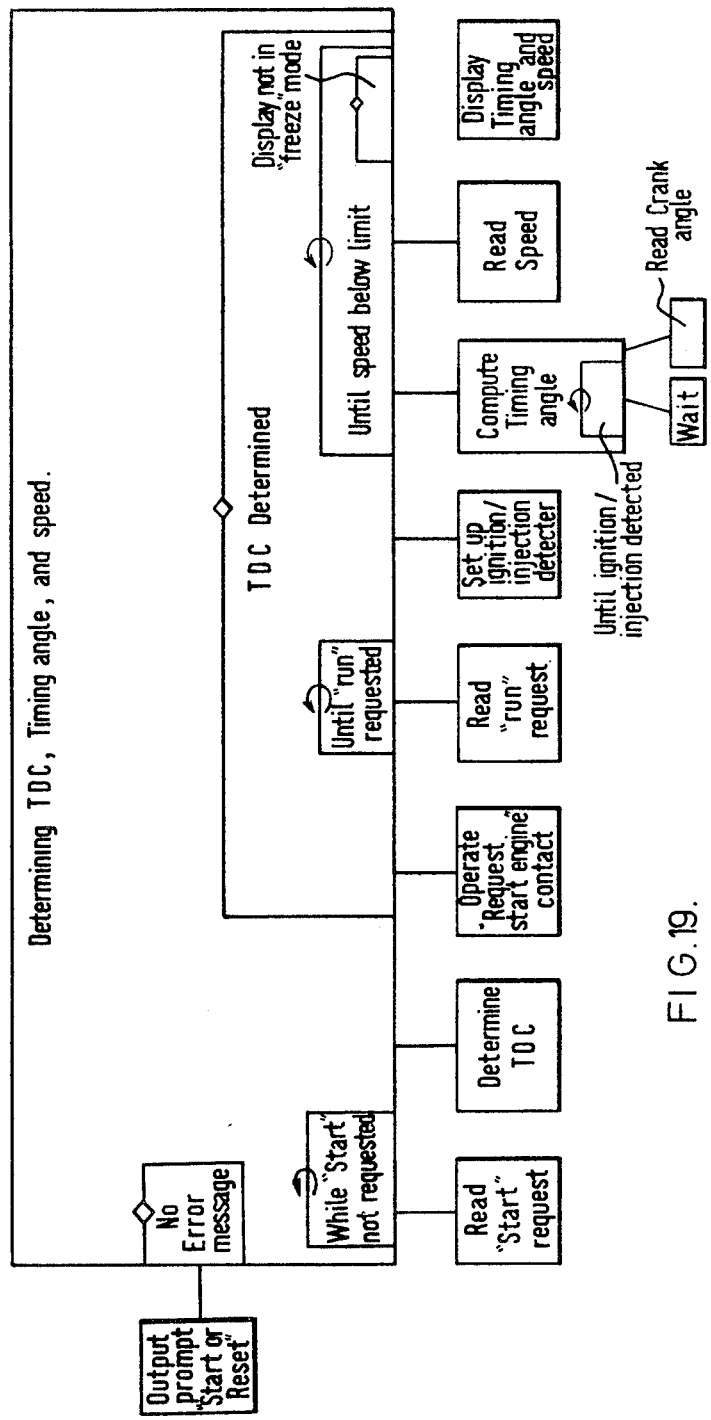

FIG. 19 illustrates in more detail the determination of TDC, timing angle, and speed steps of FIG. 17. The microcomputer waits until a "start" request is read from a "start" push button of the operator controls 3. In the absence of a "start " or "reset" request and assuming that there is no error message, and output prompt for "start or reset" is displayed by the digital display until such a request is received, then the program continues as shown in FIG. 19. If a reset request is received, however, the apparatus is cleared, in particular of the engine data so that a fresh card has to be inserted and withdrawn so as to reload engine data into the apparatus. Assuming that a start request is received, then top dead centre is determined as described hereinafter with reference to FIG. 20.

When top dead centre has been determined, the microcomputer operates a "request start engine" contact which permits the engine to be run under its own power. The microcomputer then waits for a "run" request to be read from a "run" push button of the operator controls 3 and, when a run request is received, sets up the ignition/injection detector. In this respect, although the embodiment described hereinbefore is particularly intended to be used with compression-ignition engines, the acoustic sensor of injector opening may be replaced by any suitable sensor for indicating ignition of the fuel-air mixture in the cylinder. For instance, in the case of a conventional spark-ignition petrol engine or the like, a capacitive or inductive transducer may be attached to the cable to the spark plug for the cylinder. Alternatively a cylinder luminance probe may be used to indicate the onset of ignition. Until the engine speed falls below a predetermined limit, the following steps are performed. The timing angle is computed by waiting until ignition or injection is detected, when the crank angle is read. The engine speed is then determined as described hereinafter and, assuming that the display is not in the "freeze" mode i.e. the "freeze" push button of the operator controls 3 has not been actuated, the timing angle and speed are displayed. The digital display 4 in FIG. 7 illustrates diagrammatically a typical reading in which the first three digits indicate a timing angle of 15.2 degrees, the next digit indicates "B" for "before top dead centre" ("A" being used to indicate "after top dead centre"), and the next three digits indicate 950 revolutions per minute engine speed. If the "freeze" push button is actuated, then the digital display is frozen until the freeze mode is disabled.

To determine the engine speed (see above and see FIG. 17) the microcomputer 65 (FIG. 5) may use either the fuel-injection-responsive pulses from comparator 63 or the piston movement-responsive pulses (derived from transducer 8) from converter 68. Whichever pulses are used, the microcomputer 65 has to determine the pulse frequency (or average frequency) using its own internal clock and to apply any necessary proportionality factor to convert the pulse frequency or average pulse frequency to engine speed.

Figure 20A:
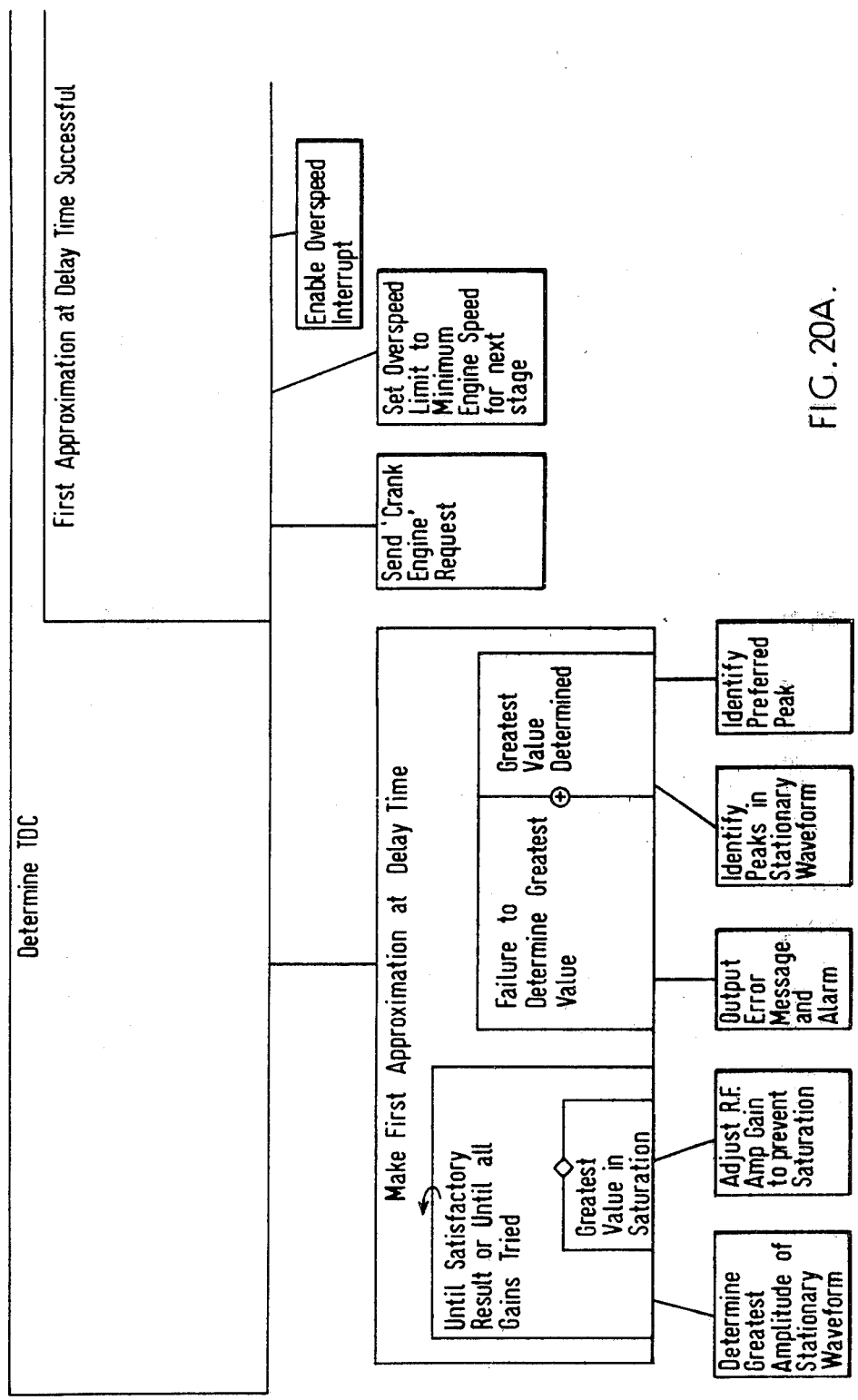
Figure 20B:
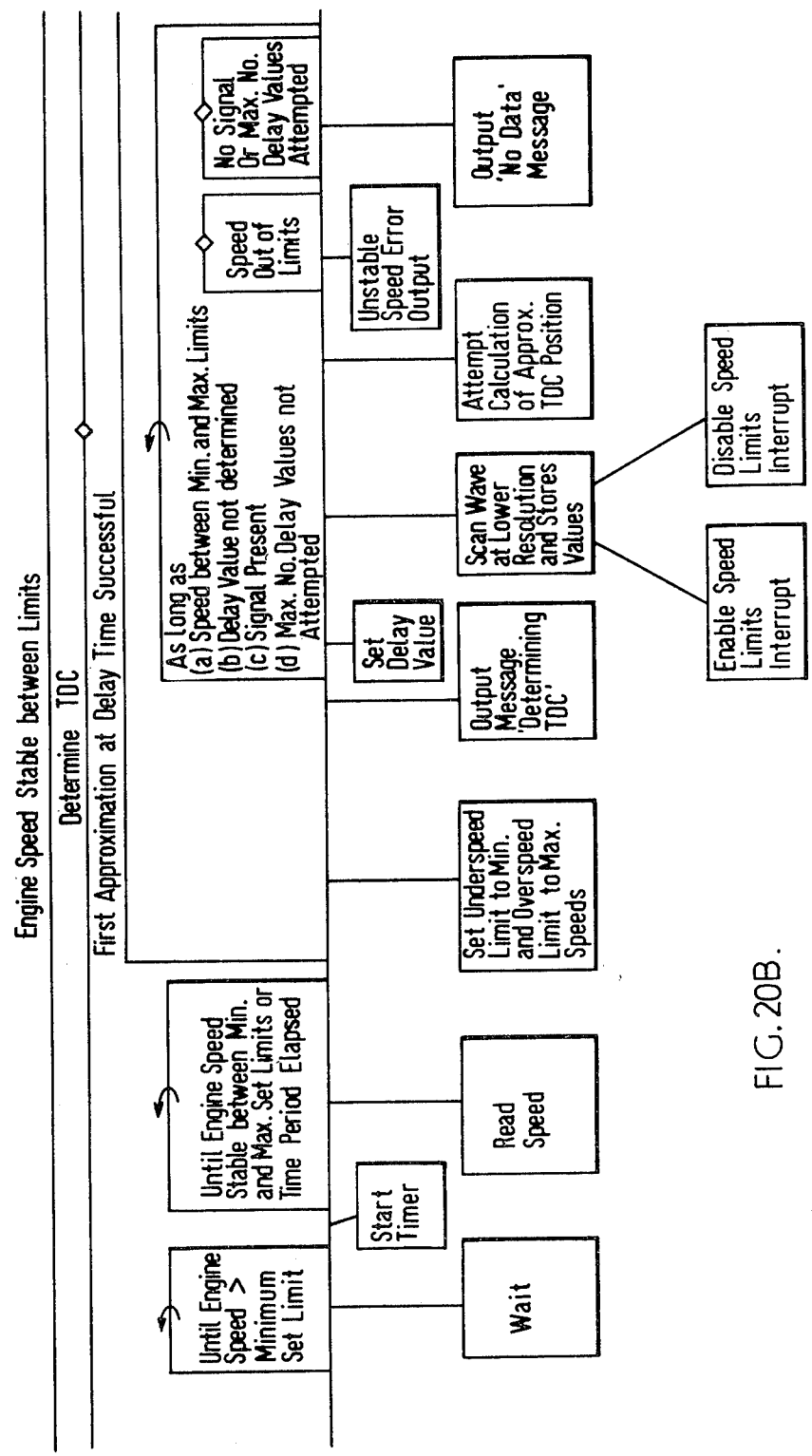
Figure 20C:
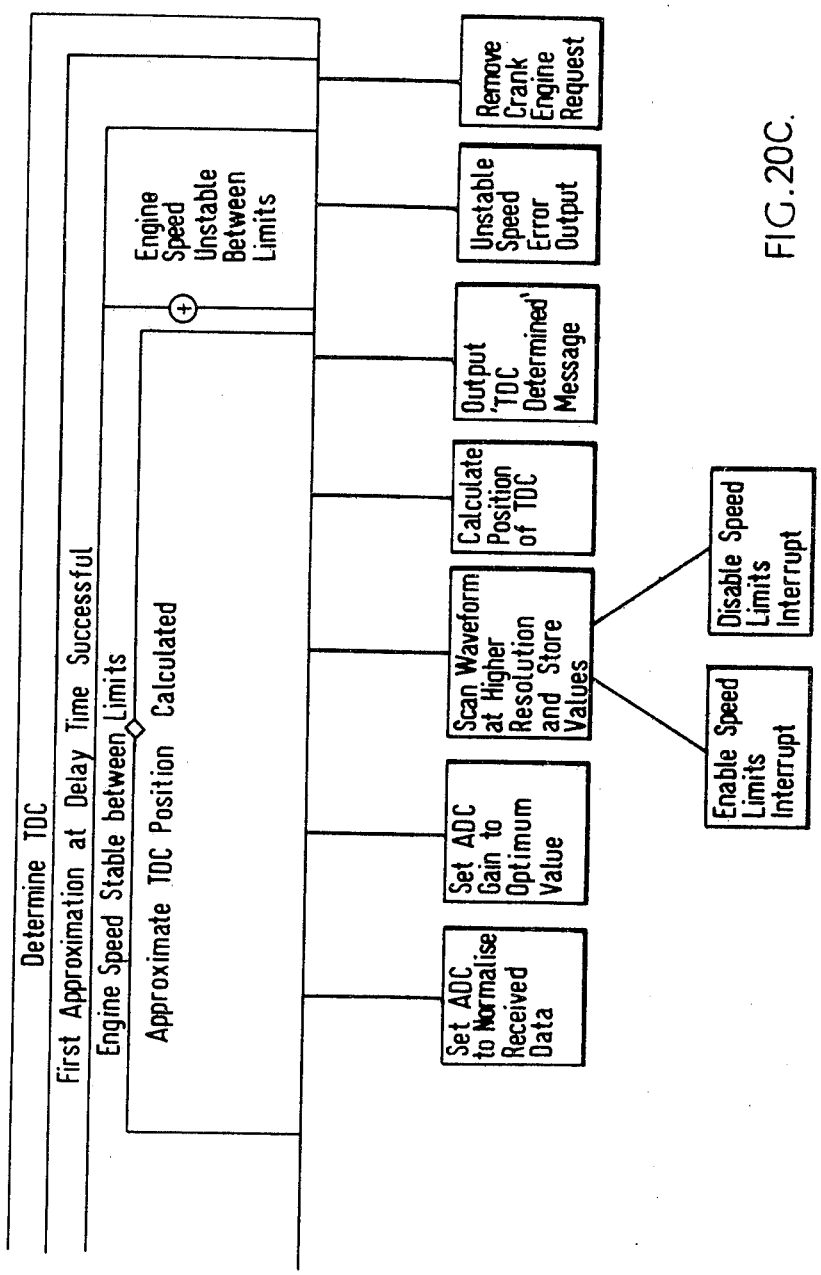

FIG. 20, which comprises three sheets, illustrates the "determine TDC" step of FIG. 19 in more detail. On the basis of the date read from the card concerning the details of the engine, such as block thickness, water jacket thickness and the like, a first approximation at the delay t is made. The greatest amplitude of the "stationary" wave-form is determined for the selected delay time, and the gain of the RF amplifier 66 is adjusted by the microcomputer so as to prevent saturation of the apparatus. In the event of failure to determine the greatest value, an output error message is formed and an alarm sounded. If the greatest value is satisfactorily determined, the microcomputer identifies the peaks in the "stationary" wave form and identifies a preferred peak. The peaks in the wave-form are determined by detecting the zero crossings of the reflected ultrasonic signal and interpolating mid-way between adjacent zero crossings by adjusting the delay t to obtain the peak values at the output of the sample/hold circuit 67. The preferred peak for use in subsequent determination of top dead centre is then identified, for instance as a result of the information supplied as part of the engine data on the punched card. This first approximation of the delay time is obtained with the engine stationary.

If the first approximation at the delay time is successful, the microcomputer sends a "crank engine" request and the crank shaft of the engine is then cranked. The microcomputer then sets the overspeed limit to minimum engine speed, and enables an overspeed interrupt. The microcomputer waits until the engine speed is greater than the minimum set limit, and then starts a timer. The engine speed is read until it is stable between the minimum and maximum set limits or until the time period of the timer elapses. If the engine speed is unstable between the speed limits, an "unstable speed error" message is output. When the engine speed is stable between the limits, the microcomputer sets the under speed limit to minimum and the overspeed limit to maximum and supplies a "determining TDC" output message to the digital display.

For as long as the engine speed remains between the maximum and minimum limits, the approximate top dead centre position has not been determined, a signal is present, and the maximum number of delays has not been attempted, the microcomputer sets a delay value t, scans the wave at relatively low resolution and stores values, and attempts to calculate the approximate top dead centre position. The low resolution of the scanning corresponds to triggering the ultrasonic transducer 8 at 1 degree steps of crank-shaft rotation i.e. for every tenth output pulse of the optical transducer 71. The calculations are performed to provide a low resolution indication of the top dead centre position of the piston. If the speed of the engine goes outside the limits, an "unstable speed error" output is produced. If there is no signal present or if the maximum number of delay values has been attempted, the microcomputer outputs a "no data" message.

If the approximate top dead centre position is calculated, the microprocessor sets the analog/digital converter 68 so as to normalise the received data, sets the converter gain to optimum value, and scans the waveform at higher resolution and stores values. The higher resolution scanning corresponds to triggering of the ultrasonic transducer at 0.1 degree incremental positions of the crank shaft so that the transducer is triggered by each output pulse of the optimal transducer 71. While scanning at higher resolution, a speed limits interrupt is enabled and then disabled.

The microcomputer then calculates the position of top dead centre, taking into account any crank-shaft off-set data read from the punched card relating to the engine under test. A message "TDC determined" is output. Finally, the crank engine request is removed.

The microcomputer 65 may be set up so that the apparatus can, if desired, be used to provide a measurement of the speed of an engine which is disposed in a vehicle and thus permit the engine speed to be determined without requiring removal of the engine or dismantling of the engine or any drive chain for gaining access to moving parts of the engine. The transducer 8 may be attached to the cylinder block adjacent a cylinder thereof. The engine may then be run in the normal way and the microcomputer 65 processes the output signal from the transducer 8 and provides as its output a signal indicative of the speed of the engine. For instance, the output signal from the microcomputer 65 may be supplied to the digital display 4 (FIG. 1) in order to provide a visual indication of the engine speed. Alternatively, the output signal of the microcomputer 65 may be stored for subsequent processing or may be supplied to other equipment which may be used to perform testing of the engine while mounted in the vehicle.

However, the apparatus 1 is primarily designed to be used with the engine which has been removed from a vehicle or the like so as, for instance, to be mounted on a test stand, or to be used on a assembly line for testing newly manufactured engine one after another.

Shaft Encorder

The shaft encoder 72 is preferably a commercially available shaft encoder, for example, either one manufactured by Gaebridge Ltd of England known as their Type 45 HD, or one manufactured by Ferranti Ltd of England known as their type 23L47/M121. The shaft encoder 72 is adapted to give a "count" of 3600, that is to say, to resolve the position of the engine crankshaft to one tenth of a degree. The shaft encoder 72 may for example comprise a disc 83 (FIG. 8) connected or connectible directly to the engine crankshaft to rotate as one therewith, the disc having 3600 triggering edges (for example the leading edges of 3600 slots in the direction of rotation) around it to enable resolution of the crankshaft position to ±0.1°. In the illustrated example, the shaft encoder 72 is represented as having a light-emitting diode 80 (FIG. 8) and a light-sensitive diode 81 arranged with the disc 83 therebetween, so that one revolution of disc 83 (with one revolution of the engine crankshaft produces 36)) pulses from the diode 81, which is connected to the input of an amplifier 82.

Figure 21:
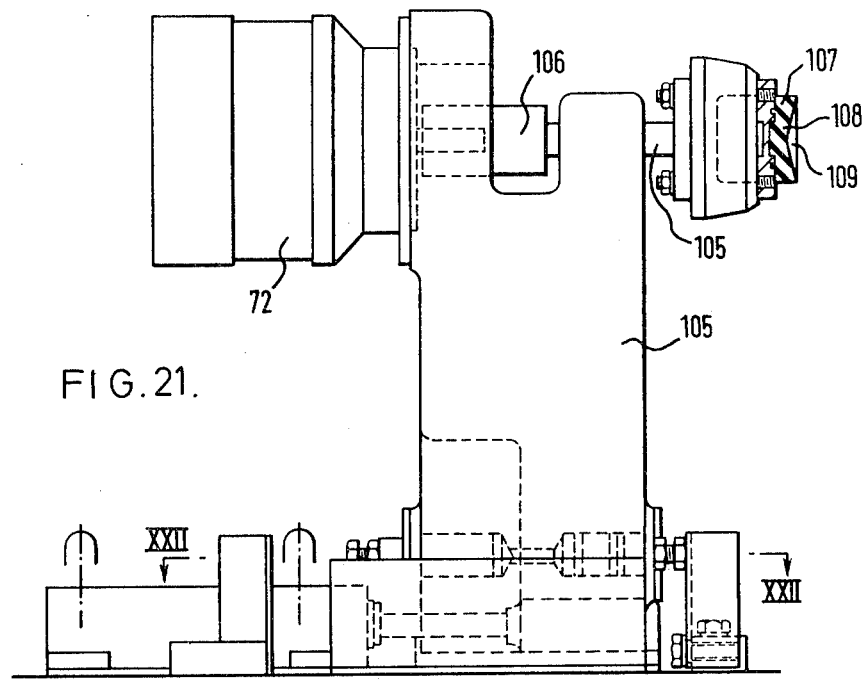
FIG. 21 is a side elevation.
Figure 22:
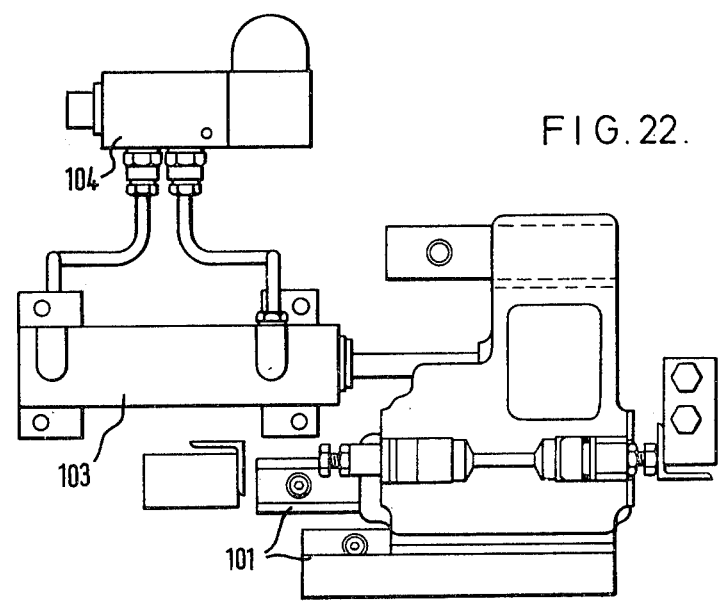
FIG. 22 is a section on line XXII—XXII of FIG. 21, of a mounting arrangement of a shaft encoder.

Referring to FIGS. 21 and 22, the shaft encoder 22 is mounted to a support 100 which is mounted on slides 101 so as to be slidable to and fro axially of the shaft encoder 72 by means of a double-acting pneumatic jack 103 controlled by a solenoid-operated valve 104. A rotatable jack-shaft 105 is journalled in the support 100 co-axial with the shaft encoder 72 and connected thereto by a flexible coupling 106 of a type adapted to accommodate a limited amount of relative axial movement between the shaft encoder 72 and the jack-shaft 105. A bonded rubber-to-metal coupling member 107 is mounted on a front end of the jack-shaft 105, to directly engage one end of the crankshaft (co-axial with the shaft encoder 72 and the jack-shaft 105) of the engine 6 (FIG. 2) when the pneumatic jack 103 is operated by valve 104 to drive the support 100 towards the engine 6 (not shown) in FIGS. 21 and 22). The rubber 108 of member 107 is semi-hard, with a conical depression 109 in its front face to facilitate centering (i.e. making co-axial the engine crankshaft and the jack-shaft 105.

Modifications

Various modifications may be made within the scope of the invention. For instance, the punched card may be replaced by a magnetic card. Also, instead of utilizing the shaft encoder 72, the apparatus may be operated from a toothed ring, such as the starter ring, with interpolation between teeth in order to obtain better accuracy that can normally be obtained from toothed rings.

The ultrasonic transducer and/or the high frequency microphone may be arranged for automatic contact and location with respect to the engine block and fuel injectors. Further, the apparatus may be used in conjunction with a robotic timing adjuster. The apparatus may then be used, in conjunction with a suitable host computer, to perform completely automatic timing adjustment of engines, for instance at the end of an engine assembly or production line.

If the apparatus is being operated manually, then it will generally be necessary to indicate to the microcomputer whether the ultrasonic transducer is disposed in the upper half or lower half of the piston ring stroke, essentially so as to tell the microcomputer whether top dead centre or bottom dead centre is being computed. For instance, if the ultrasonic beam passes through the cylinder at the upper half of the piston ring stroke, the microcomputer can identify the two signals, corresponding to passage of the rings through the beam, which are "closer together" so that top dead centre falls mid-way between these positions, allowing for possible crank shaft off-set. However, if the ultrasonic beam passed through the lower half of the stroke, then the point mid-way between the two piston ring signals with wider spacing would correspond to top dead centre.

I claim:

1. A method of indicating a predetermined position of a crankshaft of a piston engine, said engine comprising at least one piston reciprocating in a cylinder and connected to said crankshaft, said method comprising: transmitting and receiving an ultrasonic signal at a place intermediate the ends of the piston stroke in the cylinder; producing first and second electrical signals responsive to first and second changes respectively in the received ultrasonic signal due to passage of a part of the piston past the said place on first and second successive strokes respectively of the piston;
providing a third electrical signal corresponding to incremental rotary positions of the crankshaft; and
determining the predetermined position of the crankshaft from the first, second, and third electrical signals.

2. A method as claimed in claim 1 wherein the ultrasonic signal is transmitted and received as a series of pulses and wherein each of said first and second electrical signals is obtained by transducing the received ultrasonic signal into a corresponding electrical signal and sampling said corresponding electrical signal at a timed instant, said timed instant being such that the portion sampled of said corresponding electrical signal is a portion which exhibits changes corresponding to said first and second changes in the received ultrasonic signal.

3. A method as claimed in claim 2 wherein each transmitted pulse of the ultrasonic signal is responsive to said third electrical signal at a corresponding incremental rotary position of the crankshaft.

4. A method as claimed in claim 1 wherein said part of the piston is a piston ring.

5. A method as claimed in claim 1, wherein the ultrasonic beam has a frequency substantially equal to 2½ MHz.

6. A method as claimed in claim 1 in which said third electrical signal comprises ultrasonic beam pulses and the predetermined position of the crankshaft is initially approximately determined by producing said ultrasonic beam pulses at relatively coarsely spaced rotary incremental positions of the crankshaft, after which the predetermined position is found more accurately by producing said ultrasonic beam pulses at relatively finely spaced rotary incremental positions.

7. A method as claimed in claim 6 in which the relatively coarse and fine spacings are 1 degree and 0.1 degree, respectively.

8. A method as claimed in claim 1 and further comprising the steps of determining instants of injection of fuel and relating the instants of fuel injection to the predetermined position of the crankshaft.

9. The combination of the method as claimed in claim 1 with a method of determining opening of an injection, comprising the steps of:
applying an electro-acoustic transducer to an injector; and
monitoring the level of the output signal of the transducer to detect an increase therein indicative of opening of the injector and further comprising the step of determining the instant of opening of the injector and relating said instant to said predetermined position of the crankshaft.

10. A method as claimed in claim 1 and further comprising the steps of determining instants of ignition of fuel and relating the instants of fuel ignition to the predetermined position of the crankshaft.

11. A method as claimed in claim 1 in which the predetermined position of the crankshaft is that corresponding to top or bottom dead centre of the piston in the cylinder and is determined by establishing the position of the crankshaft mid-way between consecutive pairs of changes in the level of the amplitude samples with a correction applied in the event that the centre line of the crankshaft is offset from the piston centre line of the engine.

12. Apparatus for indicating a predetermined position of a crankshaft of a piston engine, said engine comprising at least one piston reciprocable in a cylinder and connected to said crankshaft, said apparatus comprising: ultrasonic transmitter means and receiver means for respectively transmitting and receiving an ultrasonic signal at a place intermediate the ends of the piston stroke in the cylinder; means for producing first and second electrical signals responsive to first and second changes respectively in the received ultrasonic signal due to passage of a part of the piston past the said place on first and second successive strokes respectively of the piston; means for providing a third electrical signal corresponding to incremental rotary positions of the crankshaft, and processing means for determining the predetermined position from the first, second and third electrical signals.

13. An apparatus as claimed in claim 12, wherein the receiver means is sensitive to changes in amplitude level of the received ultrasonic signal to provide the first and second electrical signals.

14. An apparatus as claimed in claim 12, wherein said receiver means is arranged to receive the ultrasonic signal reflected from the cylinder wall.

15. An apparatus as claimed in claim 12, wherein the transmitter means is arranged to transmit the ultrasonic signal with a frequency substantially equal to 2½ MHz.

16. Apparatus as claimed in claim 12, wherein said ultrasonic transmitter and receiver means is adapted to transmit and receive said ultrasonic signal as a series of pulses, and wherein said first and second electrical signal producing means comprises means for transducing the received ultrasonic signal into a corresponding electrical signal, means for timing a delay each time an ultrasonic pulse is transmitted, and means for sampling said corresponding electrical signal upon expiry of the timed delay.

17. An apparatus as claimed in claim 16 and further comprising means responsive to said third electrical signal to cause transmission of each ultrasonic signal pulse at a corresponding incremental rotary position of the crankshaft.

18. An apparatus as claimed in claim 12, wherein the third electrical signal providing means comprises a transducer arranged to detect teeth of a flywheel attached to the crankshaft.

19. Apparatus according to claim 12 wherein said third electrical signal comprises initial ultrasonic beam pulses produced at relatively coarsely spaced rotary incremental positions of the crankshaft and subsequent ultrasonic beam pulses produced at relatively finely spaced rotary incremental positions, and said processing means initially approximately determines the predetermined position of the crankshaft utilizing said initial beam pulses and subsequently determines the predetermined position more accurately utilizing said subsequent beam pulses.

20. Apparatus according to claim 19 in which said relatively coarse and fine spacings are 1 degree and 0.1 degree, respectively.

21. Apparatus as claimed in claim 12 and further comprising means for determining instants of injection of fuel and for relating the instants of fuel injection to the predetermined position of the crankshaft.

22. The combination of the apparatus as claimed in claim 12 with an apparatus for determining opening of an injector, comprising an electro-acoustic transducer arranged to be applied to the injector and arranged to produce an output signal, and a monitoring circuit arranged to monitor the level of the output signal of the transducer to detect an increase therein indicative of opening of the injector and further comprising means for determining the instant of opening of the injector and for relating said instant to said predetermined position of the crankshaft.

23. The combination as claimed in claim 22 and further comprising signal-processing means which comprises a microcomputer.

24. An apparatus as claimed in claim 23 in which the microcomputer includes data input means for receiving data on an engine whose timing is to be determined.

25. An apparatus as claimed in claim 24, in which the data input means is a punched or magnetic card reader.

26. A method of setting the timing of fuel injection of a piston engine, comprising determining the timing of fuel injection by a method as claimed in claim 22, and adjusting the fuel injection timing to a desired value.

27. An apparatus as claimed in claim 12, in which the third electrical signal providing means comprises a position transducer arranged to provide output pulses in response to incremental rotations of the crankshaft.

28. An apparatus as claimed in claim 27, in which the position transducer is an opto-electronic transducer cooperating with at least one disc having circumferentially spaced slits for mounting on the crankshaft.

29. An apparatus as claimed in claim 27, in which the sampling means comprises a sample/hold circuit, having a signal input for receiving the electrical signal from the ultrasonic transducer means and a control input, a variable delay circuit having an output connected to the control input of the sample/hold circuit and an input arranged to receive the output signals of the position transducer, and means for adjusting the delay of the variable delay circuit.

30. An apparatus as claimed in claim 29 in which the variable delay circuit comprises a voltage controlled monostable multivibrator.

31. An apparatus as claimed in claim 29 and further comprising signal-processing means which includes the said adjusting means.

32. Apparatus as claimed in claim 12 wherein said transmitter means and receiver means comprises a common ultrasonic transmitting and receiving element.

33. An apparatus for determining opening of an injector, comprising an electro-acoustic transducer arranged to be applied to the injector and arranged to produce an output signal, and a monitoring circuit arranged to monitor the level of the output signal of the transducer to detect an increase therein indicative of opening of the injector, said electro-acoustic transducer comprising a high frequency microphone adapted to be directed at said injector and said monitoring circuit comprising comparator means for providing a signal indicative of the onset of ignition when the amplitude of the microphone output signal exceeds a predetermined value.

* * * * *